United States Patent [19]
Han

[11] Patent Number: 6,094,230
[45] Date of Patent: Jul. 25, 2000

[54] APPARATUS AND METHOD FOR DISPLAYING IMAGES ON A MULTIPLE SCREEN DTV

[75] Inventor: Dongil Han, Seoul, Rep. of Korea

[73] Assignee: LG Electronics Inc., Seoul, Rep. of Korea

[21] Appl. No.: 09/152,108

[22] Filed: Sep. 14, 1998

[30] Foreign Application Priority Data

Nov. 28, 1997 [KR] Rep. of Korea ...................... 97/63833

[51] Int. Cl.[7] .............................. H04N 5/445; H04N 5/45
[52] U.S. Cl. ........................... 348/564; 348/567; 348/568
[58] Field of Search .................................... 348/564, 565, 348/567, 568, 563, 588, 581; H04N 5/45, 5/445, 9/74

[56] References Cited

U.S. PATENT DOCUMENTS 5,712,689   1/1998   Yasuki ..................................... 348/564

*Primary Examiner*—Sherrie Hsia

[57] ABSTRACT

A system and method for generating the display of multiple screen digital television includes a size controller to adjust the image size by cutting or enlarging the outer portion of the image before the image is reduced to fit the size of a selected PIP window. The size controller also adjusts the image sizes for the main display window if the input image data format does not have a standard image size. The size controller facilitates the processing of image format with special or unconventional image sizes.

12 Claims, 2 Drawing Sheets

APPARATUS AND METHOD FOR DISPLAYING IMAGES ON A MULTIPLE SCREEN DTV

BACKGROUND OF THE INVENTION

The present invention is related to a digital television system, and more particularly to a system and method for generating the display of a multiple screen digital television.

In the United States, the digital television (DTV) standard allows for many types of image formats. Accordingly, the digital TV receiver must be capable of processing the many types of transmitted image formats including different frame rates of 24 Hz, 30 Hz, 60 Hz for interlaced scanning or progressive scanning, and different image resolutions of 480×640, 480×704, 720×1280, 1080×1920.

Also, the image format transmitted for a digital TV may constantly change with respect to the frame rates and the image sizes, even for the same channel. Moreover, for a multiple screen TV, the picture-in-picture PIP window may change, thereby changing the frame rates and the image size. To display the transmitted image with the many types of formats on a PIP window, the input image is first reduced to fit the size of the PIP window and stored to be displayed.

However, some image formats have image sizes which are not easily reducible to fit the PIP window. Accordingly, the hardware to process these image formats are complex and costly.

OBJECTS OF THE INVENTION

The object of the present invention is to provide a system and method to process and display the input images on the PIP window with simple and less costly hardware.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the image processor according to the present invention includes a size controller to adjust the image size before the image is reduced to fit the size of a selected PIP window. The size controller also adjusts the image sizes of image data for the main display window if the input image format does not have a standard image size.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Figure 1:
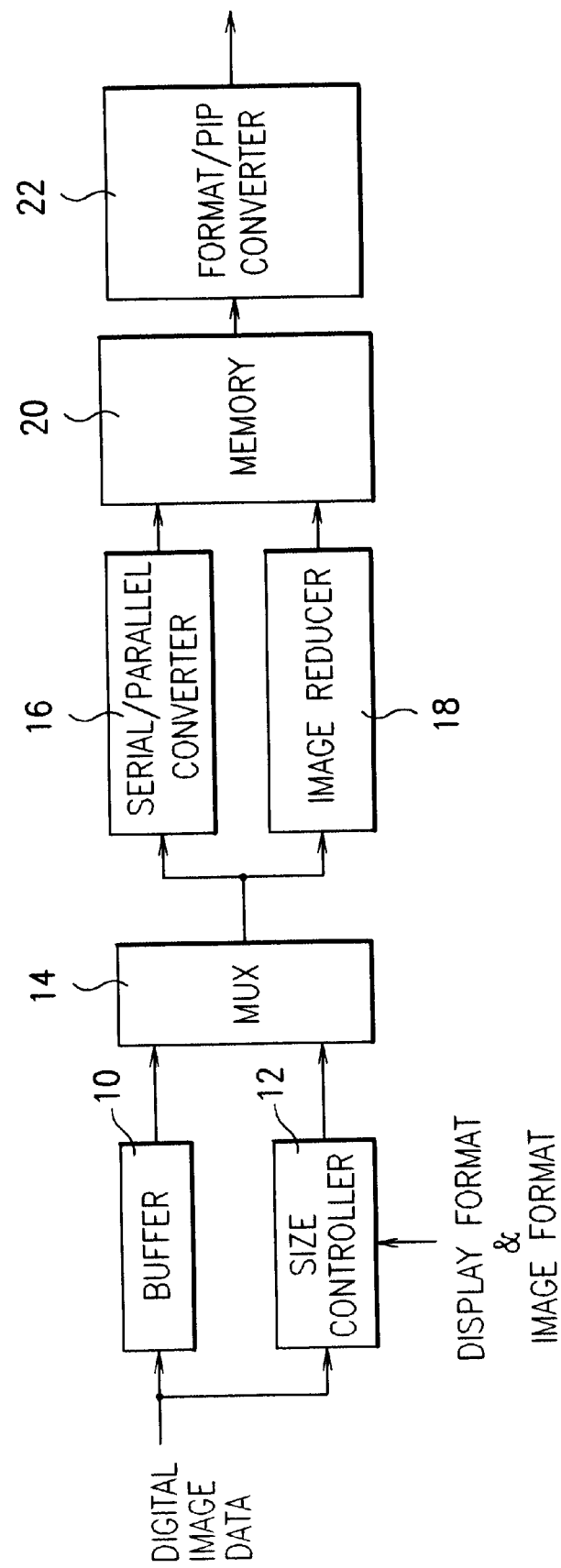
FIG. 1 is a general block diagram of the preferred embodiment of an image processor incorporating the present invention.

FIG. 1 shows a general block diagram of the preferred embodiment of an image processor according to the present invention. Depending on the display format, a multiplexer (MUX) 14 selects and outputs either the unmodified image through a buffer 10 or a modified image through a size controller 12. The size controller 12 modifies the input image by cutting or enlarging the image border at the size controller 12. According to the display format and the image format, the image data output by the MUX 14 is converted from serial to parallel form by a serial/parallel converter 16 or reduced by the image reducer 18. A memory 20 stores the converted or reduced image until the format/PIP converter 22 reads the stored image data and converts the image format or the PIP window according to the display format.

Figure 2:
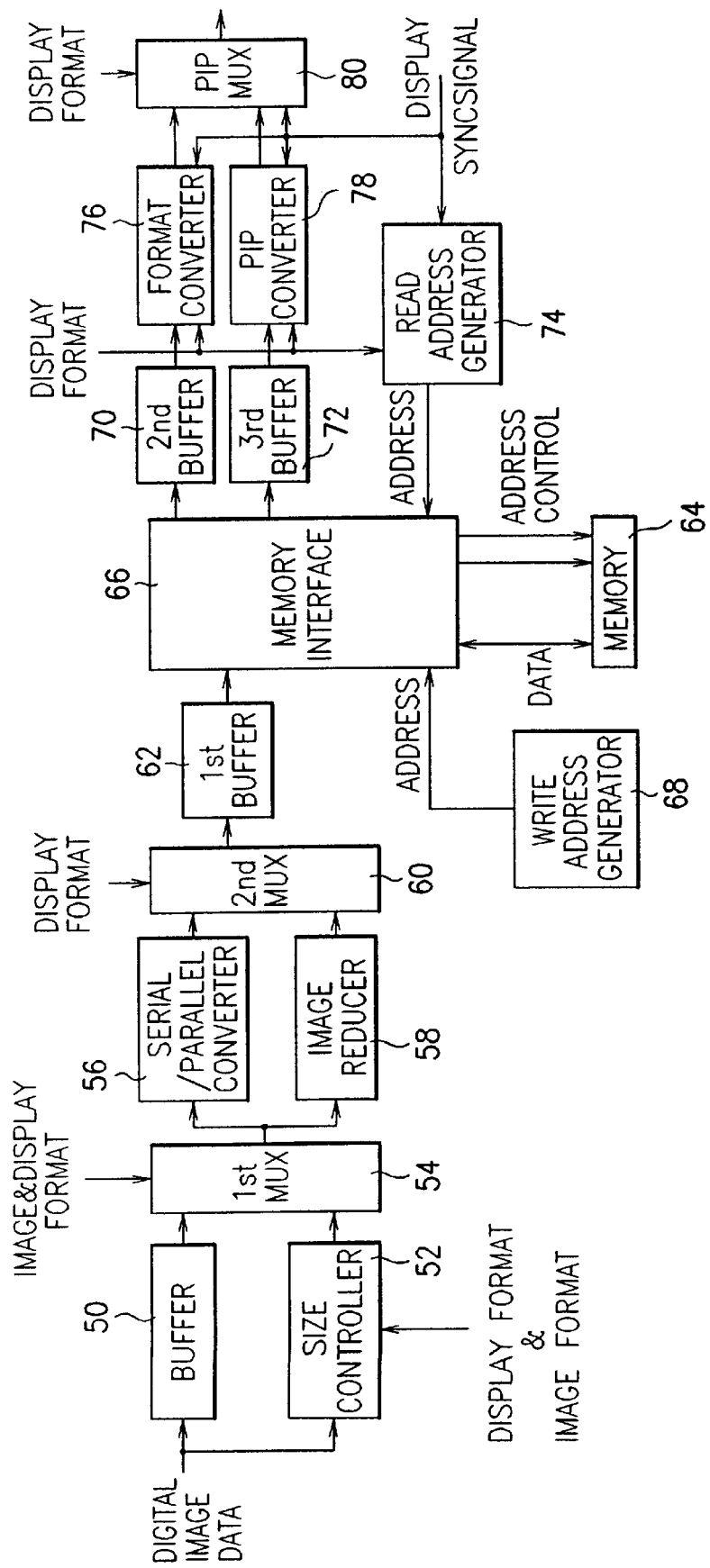
FIG. 2 shows a more detailed block diagram of the preferred embodiment of the image processor in FIG. 1.

FIG. 2 shows the preferred embodiment of the present invention. A buffer 50 receives and directly outputs the digital image data. A size controller 52 also receives the input digital image data and adjusts the outer portions of the image into an appropriate size. A first MUX 54 selects and outputs the image data from buffer 50 or the adjusted image data from the size controller 52, depending on the display format and image format. A serial/parallel converter 56 groups the selected output of the first MUX 54, wherein each grouped unit consists of 4~8 bites. An image reducer 58 also receives the selected image data from the first MUX 54 and reduces the size of the entire image into an appropriate size. The resized image data is stored in parallel form.

A second MUX 60 selects and outputs the grouped image data or the resized image data, depending on the display format. A first buffer 62 temporarily stores the selected image data from the second MUX 60 and outputs the data to a memory 64. A memory 64 stores the image received from the first buffer 62 through a memory interface 66 and also outputs the image when read by the memory interface 66. The memory interface 66 writes and store the image in the memory 64 through a write address generator 68. The memory interface 66 also reads and outputs the image stored in the memory 64 to second and third buffers 70, 72 through a read address generator 74.

The image data is temporarily stored in the second and third buffers 70, 72 which output the image data according to the format display. A format converter 76 receives the output of the second buffer 70 and timely converts the format of the image data to match the main display format according to the display sync signal. A PIP converter 78 receives the output of the third buffer 72 and timely converts the PIP window size according to the display sync signal. The format converter 76 and the PIP converter 78 outputs the converted image to a PIP MUX 80, which selectively outputs and displays the main image data or the PIP image data according to the display format. A detailed description will follow below.

As shown in FIG. 2, the buffer 50 receives the input digital image data and outputs the image data, without change, to the first MUX 54. Because the input image format comes with many image sizes, it is necessary for the image reducer to reduce some of the image sizes of the input image data depending on the display format and the image format. However, there are image data with special image sizes which cannot be easily reduced. In those circumstances, adjusting the outer portions of the image often facilitates the reduction of the image sizes. Accordingly, for image formats with a special image size, the size controller 52 cuts or enlarges the outer portion of the incoming data and outputs the adjusted image to the first MUX 54. Thus, when the display format is for a PIP window screen, the size controller 52 first modifies the outer portion of the image to facilitate the image reduction.

Moreover, even when the display format is for the main screen, the size controller 52 is useful for input image formats with image sizes which cannot be easily manipulated or for input image formats which are incompatible with the display format. For example, if the input image format has an image size of 480×720 for the main display, by cutting 16 horizontal pixel lines, the size controller 52 outputs an image size of 480×704 which can easily be manipulated. Using the above described method, the present invention can process many image sizes of image formats for both the PIP and main window screens.

In response to the input image format and the display format, the first MUX 54 selects and outputs to the serial/parallel converter 56 either the unmodified image output of the buffer 50 or the adjusted image output of the size controller 52. Because the selected image is output one byte at a time, the serial/parallel converter 56 groups the data into a 8 or 4 byte data bus for faster access by the memory 64. Thus, the serial/parallel converter 56 increases the efficiency of the memory 64.

The image reducer 58 initially receives the image format information from the selected output of the first MUX 54. If the image data is for a single or multiple PIP window of a digital TV, the image can be filtered in the vertical and horizontal directions before reducing the image size. The reduced image is converted from serial to parallel output data. A second MUX 60 receives the outputs of the serial/parallel converter 56 and the image reducer. According to the display format, the second MUX 60 selects and outputs to the first buffer 62 either the image data received from the serial/parallel converter 56 or the reduced image data received from the image reducer 58.

Particularly, if the display format indicates that the image data is for the main display, the second MUX 60 selects the image data received from the serial/parallel converter 56. If the display format indicates that the image data is for a PIP window, the second MUX 60 selects the reduced image.

The first buffer 62 temporarily stores the image data received from the second MUX 60 until the memory 64 is free. The write address generator 68 generates write addresses in the memory 64. Thus, when the memory 64 is free, the first buffer 62 outputs the data to the memory 64 through the memory interface 66 by writing onto the address generated by the write address generator 68.

The second and third buffers 70, 72 read through the read address generator 74 the image data stored in the memory 64 and temporarily store a predetermined level of image data. Particularly, if the stored data level in the second and third buffers 70, 72 falls below the predetermined level determined by the display format, the read address generator 74 generates read addresses in the memory 64 to output the stored data to the second and third buffers 70, 72. The second and third buffers 70, 72 output the stored data to the format converter 76 and the PIP converter 78, wherein the image data is converted according to a change in the image format or a change in the selected PIP window.

The PIP MUX 80 is coupled to receive the image output for the main display and the image output for a PIP window display from the format converter 76 and the PIP converter 78, respectively. In response to the display format, the PIP MUX 80 selectively outputs the data received in a timely manner according to the display synchronization signal. More specifically, if the image format is for the main display, the PIP MUX outputs the main display image data. If the image format is for a PIP window, the image data for the main display and the PIP window are output together to the selected multiscreen position.

Therefore, the DTV display processor and method according to the present invention pre-adjusts the input image to a size easily reduced by a conventional DTV signal processing system. In effect, the required amount of hardware is significantly reduced with a less complex design. Also, if the input image does not have a standard image size, the present system and method simply converts the size to a conventional size which can easily be processed.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A multiscreen digital TV display image processor comprising:

an image receiver receiving input digital image data, an image format, and a display format, said image receiver outputting the image data and depending on the image and display formats, adjusting a size of an image represented by the image data before outputting the image data;

an image processor coupled to receive the image data output by said image receiver, said image processor outputting the image data in parallel form and depending on the display format, reducing the size of the image represented by the image data output by said image receiver before outputting the image data in parallel form; and a display processor coupled to said image processor and receiving the image data in parallel form to further process the image data for display.

2. A processor of claim 1, wherein said image receiver comprises:

a buffer receiving the image data, buffering the image data and outputting the buffered image data; and a size controller also receiving the image data, adjusting the size of the image represented by the image data and outputting adjusted image data.

3. A processor of claim 2, wherein said image receiver further comprises:

a first MUX coupled to receive outputs of said buffer and said size controller, said first MUX receiving the image format and the display format, and said first MUX selectively outputting the buffered image data or the adjusted image data depending on the image and display formats.

4. A processor of claim 3, wherein said image processor comprises:

a serial to parallel converter coupled to said first MUX to receive serial output from the first MUX, and convert the serial output to parallel; and an image reducer, coupled to said first MUX, receiving the serial output, reducing the size of the image represented by the serial output to fit a size of a display window to produce reduced image data and outputting the reduced image data in parallel.

5. A processor of claim 4, wherein said image processor further comprises:

a second MUX coupled to receive parallel output of said serial to parallel converter and said image reducer, said second MUX receiving the display format, and said second MUX selectively outputting one of the parallel output of said serial to parallel converter and said image reducer depending on the display format.

6. A processor of claim 5, wherein the display processor comprises:
   a memory receiving and storing data output from said second MUX;
   a format converter reading the stored data and converting the stored data according to a changed image or display format; and
   a PIP converter reading the stored data and converting the stored data according to a PIP window size.

7. A processor of claim 2, wherein said size controller adjusts the size of the image by cutting or enlarging the outer portion of the image.

8. A processor of claim 1, wherein said image receiver adjusts the size of the image represented by the image data for a PIP window if the image format indicates an image size not easily reducible by said image processor.

9. A processor of claim 1, wherein said image receiver adjusts the size of the image represented by the image data for a main display window if the image format does not have a standard image size.

10. A multiscreen digital TV image display processor comprising:
    an image receiver receiving input digital image data, an image format, and a display format, said image receiver outputting the image data and depending on the image and display formats, adjusting a size of an image represented by the image data before outputting the image data;
    an image processor coupled to receive the image data output by said image receiver, said image processor outputting the image data output by said image receiver in parallel form and depending on the display format, reducing the size of the image represented by the image data output from said image receiver before outputting the image data in parallel form; and
    a display processor coupled to said image processor and receiving the image data in parallel form to further process the image data for display on a selected multiscreen window;
    wherein said image receiver adjusts the size of the image represented by the image data by cutting or enlarging an outer portion of the image represented by the image data.

11. A multiscreen digital TV image display processor comprising:
    a buffer receiving input digital image data and outputting the image data;
    a size controller also receiving the image data and outputting adjusted image data;
    a first MUX coupled to receive output of said buffer and said size controller, said first MUX receiving an image format and a display format, and said first MUX selectively outputting the output of said buffer and said size controller depending on the image and display formats;
    an image processor coupled to receive serial output of said first MUX, said image processor converting the serial output to parallel data and outputting the parallel data, and depending on the display format, reducing a size of an image represented by the serial output before outputting the parallel data; and
    a display processor coupled to said image processor and receiving the parallel data to further process the parallel data for display on a selected multiscreen window;
    wherein said size controller adjusts the size of the image represented by the image data by cutting or enlarging an outer portion of the image represented by the image data.

12. A method for displaying images on a multiscreen digital TV comprising the steps of:
    receiving input digital image data, an image format, and a display format to output the image data, and depending on the image and display formats, adjusting a size of an image represented by the image data before outputting the image data;
    first processing serial output of said receiving step to produce image data in parallel form, and depending on the display format, reducing the size of the image represented by said serial output before outputting the image data in parallel form; and
    display processing output of said first processing step to further process the output of said first processing step for display on a selected multiscreen window.

* * * * *